United States Patent
Kormann

(10) Patent No.: US 8,923,486 B2
(45) Date of Patent: Dec. 30, 2014

(54) SYSTEM AND METHOD FOR REMOTELY DIAGNOSING AND REPORTING FAILURES IN NETWORK EQUIPMENT

(75) Inventor: David Kormann, Morristown, NJ (US)

(73) Assignee: AT & T Intellectual Property I, LP, Atlanta, GA (US)

(*) Notice: Subject to any disclaimer, the term of this patent is extended or adjusted under 35 U.S.C. 154(b) by 2139 days.

(21) Appl. No.: 11/962,275

(22) Filed: Dec. 21, 2007

(65) Prior Publication Data

US 2009/0161847 A1    Jun. 25, 2009

(51) Int. Cl.
  *H04M 1/24*  (2006.01)
  *H04M 3/28*  (2006.01)
  *H04M 11/06* (2006.01)

(52) U.S. Cl.
  CPC .............. *H04M 11/066* (2013.01); *H04M 3/28* (2013.01)
  USPC ......................................... 379/2; 379/100.15

(58) Field of Classification Search
  CPC ... H04M 1/24; H04M 3/2236; H04M 3/2209; H04M 3/30; H04M 3/301; H04M 1/68; H04M 3/242; H04M 3/2254; H04M 3/22; H04M 3/12; H04M 3/323; H04M 3/08; H04M 3/085; H04M 3/248; H04B 3/23; H04B 3/46; H04Q 3/00; H04L 12/28
  USPC ............ 379/93.09, 93.35, 67.1, 70, 1.01–35, 379/100.01, 100.15, 274, 277, 297, 337, 379/381, 88.24, 93.01, 93.11, 101.15, 379/102.01, 142.01, 377
  See application file for complete search history.

(56) References Cited

U.S. PATENT DOCUMENTS

| | | | | |
|---|---|---|---|---|
| 4,390,953 A * | 6/1983 | Johnstone | ...................... | 700/177 |
| 4,552,993 A * | 11/1985 | Hales | ...................... | 379/102.03 |
| 4,999,613 A * | 3/1991 | Williamson et al. | ........ | 340/573.4 |
| 5,062,133 A * | 10/1991 | Melrose | ...................... | 379/93.11 |
| 5,063,584 A * | 11/1991 | Lee et al. | ................... | 379/29.02 |
| 5,159,626 A * | 10/1992 | Baum et al. | ................ | 379/88.22 |
| 5,333,152 A * | 7/1994 | Wilber | ...................... | 379/102.04 |
| 5,644,629 A * | 7/1997 | Chow | ....................... | 379/142.07 |
| 5,652,712 A * | 7/1997 | Szczebak et al. | ............... | 702/85 |
| 5,699,414 A * | 12/1997 | Telibasa | ..................... | 379/88.13 |
| 5,719,922 A * | 2/1998 | Bremer et al. | ............. | 379/88.13 |
| 5,734,696 A * | 3/1998 | Day | ............................. | 379/9.06 |
| 6,014,369 A * | 1/2000 | Takahasahi | ................... | 370/248 |
| 6,385,299 B1 * | 5/2002 | Brooks et al. | ..................... | 379/9 |
| 6,738,455 B1 * | 5/2004 | Miyagawa | ................. | 379/27.01 |
| 6,751,300 B2 * | 6/2004 | Muller | ....................... | 379/88.18 |
| 6,810,112 B1 * | 10/2004 | Eguchi et al. | ..................... | 379/9 |
| 6,834,099 B1 * | 12/2004 | Cowden et al. | ............ | 379/29.01 |
| 7,266,183 B1 * | 9/2007 | Jones, IV | ................... | 379/88.25 |
| 2003/0161454 A1 * | 8/2003 | Nassimi | .................... | 379/93.09 |
| 2005/0047565 A1 * | 3/2005 | Nassimi | .................... | 379/93.05 |

OTHER PUBLICATIONS

Modem Auto-Answer, Updated Mar. 17, 2004.*

* cited by examiner

*Primary Examiner* — Fan Tsang
*Assistant Examiner* — Akelaw Teshale
(74) *Attorney, Agent, or Firm* — Fay Kaplun & Marcin, LLP

(57) ABSTRACT

A system and method for initiating a telephone call to a telephone line that is connected to a modem and an answering machine, the modem being configured to connect to the telephone call prior to the answering machine, determining whether the modem has connected to the telephone call, determining, if the modem has not connected to the telephone call, whether the answering machine has connected to the telephone call and providing a first indication to a user if neither of the modem nor the answering machine has connected to the telephone call.

20 Claims, 2 Drawing Sheets

SYSTEM AND METHOD FOR REMOTELY DIAGNOSING AND REPORTING FAILURES IN NETWORK EQUIPMENT

BACKGROUND

Many sites housing network equipment are remote and unstaffed. As a result, no human is typically present to diagnose equipment failures on-site. Dispatching a technician to do so can be costly and time-consuming. It may be advantageous to be able to diagnose such failures remotely.

SUMMARY OF THE INVENTION

A method for initiating a telephone call to a telephone line that is connected to a modem and an answering machine, the modem being configured to connect to the telephone call prior to the answering machine, determining whether the modem has connected to the telephone call, determining, if the modem has not connected to the telephone call, whether the answering machine has connected to the telephone call and providing a first indication to a user if neither of the modem nor the answering machine has connected to the telephone call.

A system having a networking component connected to a power source, a modem connected to the networking component, to the power source, and to a telephone line, the modem being configured to answer an incoming call on the telephone line after a first predetermined time period and a telephone answering machine connected to the power source and to the telephone line, the answering machine being configured to answer the incoming call on the telephone line after a second predetermined time period, the second time period being longer than the first predetermined time period.

DETAILED DESCRIPTION

Figure 1:
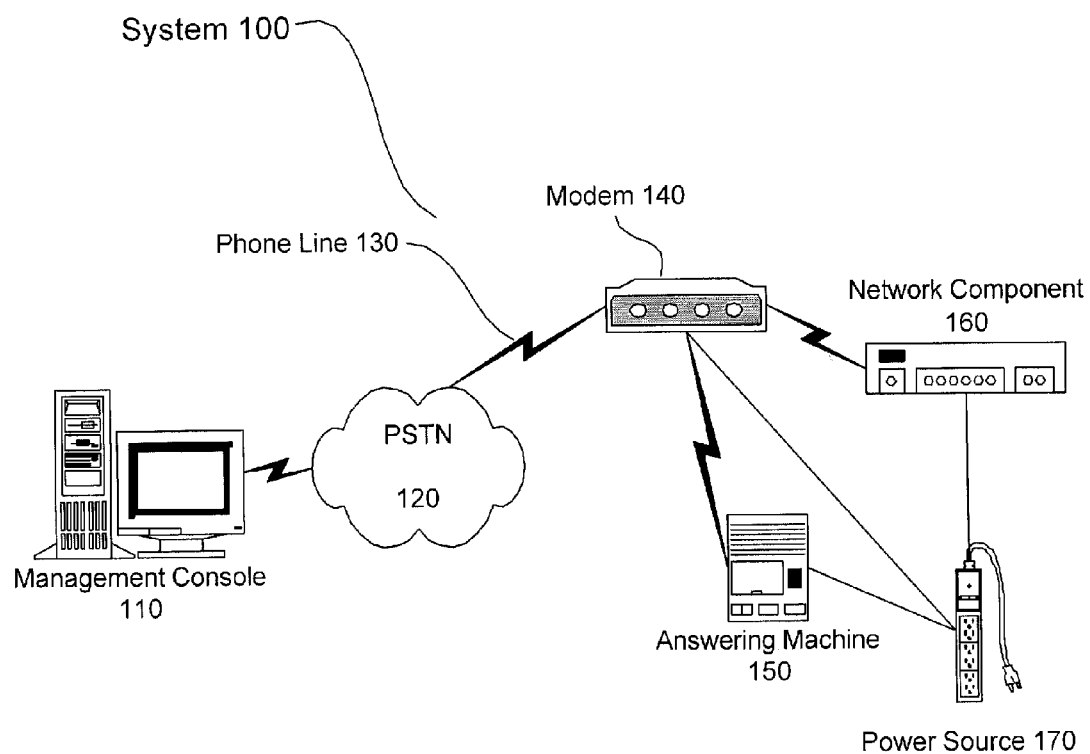
FIG. 1 shows an exemplary system according to the present invention.

The exemplary embodiments of the present invention may be further understood with reference to the following description and the appended drawings, wherein like elements are referred to with the same reference numerals. The exemplary embodiments of the present invention describe systems and methods for diagnosing problems with network hardware.

The exemplary embodiments of the present invention include systems and methods whereby network problems may be diagnosed remotely with more precision than previously possible. This may prevent excessive site trips by technicians; such trips may be time-consuming and expensive, and may also be inadequate to resolve certain types of problems (e.g., power outages). Moreover, the exemplary embodiments of the present invention may be implemented with only minor cost and difficulty.

FIG. 1 illustrates an exemplary system 100 according to the present invention. The system may be administered by a management console 110, which may be, for example, a user workstation dedicated to operating the system 100, a user workstation dedicated to network management but performing additional tasks besides those disclosed in this disclosure, a general-purpose workstation capable of performing these tasks, etc. The management console 110 may be a dedicated hardware component or may be a software application running on a computer system that also performs other tasks.

The management console 110 may communicate with other elements of the system 100 via a public switched telephone network ("PSTN") 120. The PSTN 120 is a network of circuit-switched telephone networks, and may typically use E.163/E.164 addresses (i.e., telephone numbers) for addressing of data. The PSTN may include a plurality of telephone lines, including telephone line 130, to which the modem 140 and the answering machine 150 are both connected.

Using the PSTN 120, the management console 110 may have access to the modem 140 and the answering machine 150. The modem 140 may be any type of modem that may be capable of communicating with a computer and of conducting data communications over the PSTN 120. The answering machine 150 may be a device that monitors traffic over a single phone line of the PSTN 120 (e.g., the phone line 130) and that is configured to answer an incoming call after a preselected period of time. The answering machine 150 may be configured to then play an outgoing message and record an incoming message. In the exemplary system 100 of the present invention, both the modem 140 and the answering machine 150 are configured to answer an incoming call after a respective preselected period of time; the configured period of time for the answering machine 150 may be longer than that for the modem 140. In one exemplary embodiment, the modem 140 may be configured to answer an incoming call on the phone line 130 after one ring, while the answering machine 150 may be configured to answer an incoming call on the phone line 130 after three rings.

The modem 140 may be connected to a network component 160. The network component 160 may be, for example, a data router, but may also be any other type network component which is desirable to monitor remotely, and which may either incorporate a modem internally or may be attached to one. Those of skill in the art will understand that while FIG. 1 illustrates a system 100 including a network component 160 connected to a separate modem 140, the principles of the present invention may be equally applicable to a network component 160 that includes an integral modem.

The modem 140, answering machine 150, and network component 160 may be connected to the same power source 170. FIG. 1 illustrates that the power source 170 is a power strip or surge protector; however, the power source 170 may be any comparable component suitable for causing the modem 140, the answering machine 150, and the network component 160 to respond identically to power failures.

Figure 2:
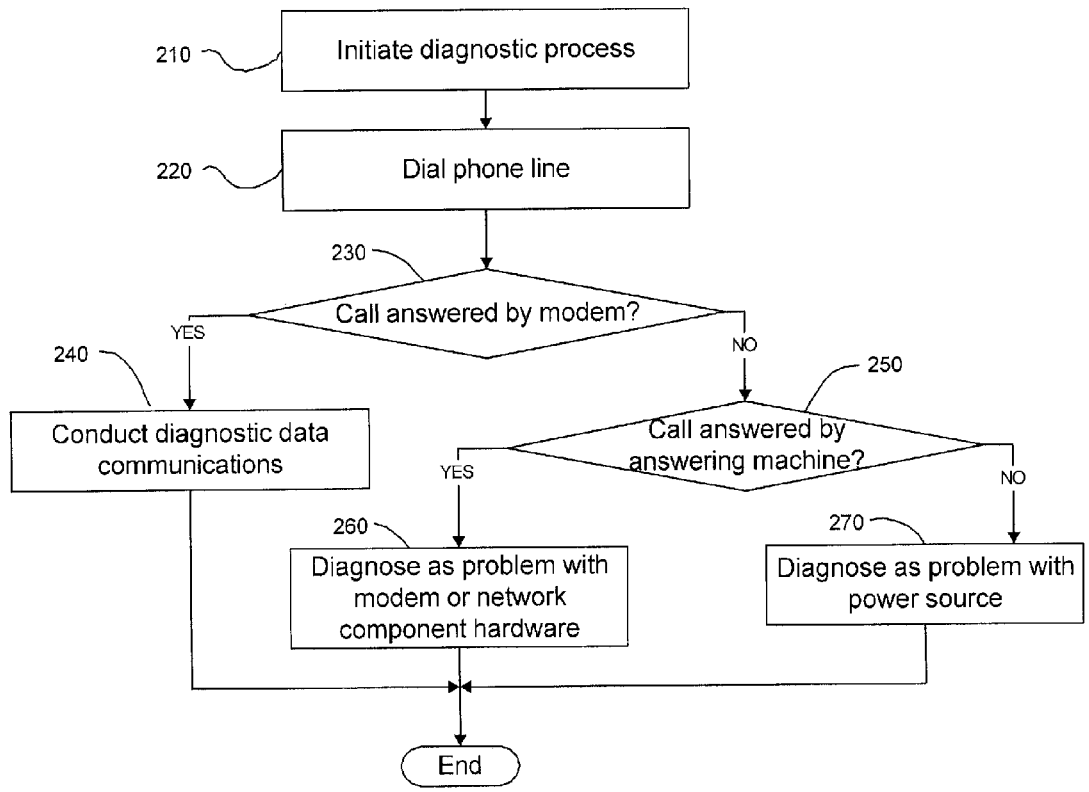
FIG. 2 shows an exemplary method according to the present invention.

FIG. 2 illustrates an exemplary method 200 by which the exemplary system 100 of FIG. 1 may operate. Those of skill in the art will understand that while the method 200 is described herein with specific reference to the system 100, it is equally applicable to any other combination of elements that may be capable of executing the steps described. In step 210, a user of the management console 110 initiates a process to diagnose a problem involving the network component 160. This may occur because the user has become aware of the existence of an undiagnosed problem with the network component 160 (e.g., because a signal has been lost on a data link to the network component 160, because a loss of functionality of the network component 160 has been reported by someone attempting to access the network component 160, etc.) or as part of periodic maintenance to communicate with the network component 160 (which may be one of a plurality of similar components comprising a network) to determine whether any problems have occurred. Alternately, in other embodiments of the present invention, the process may be initiated automatically (e.g., by a computer program running on the management console 110 in embodiments where the management console 110 is a hardware component; by the management console 110 itself in embodiments where the management console 110 is a computer program, etc.) either in response to a specific problem involving the network component 160 or periodically to monitor the performance of the network component 160 as well as of other network components (not shown).

In step 220, the management console 110 dials the phone line 130 via the PSTN 120. Dialing may be accomplished, for example, via a modem (not shown) that is connected to or part of the management console 110, or via another mechanism through which data communications may be conducted. In step 230, the modem 140 does or does not answer the incoming call on the phone line 130 within a first predetermined time period (e.g., one ring, five seconds, etc.). If the modem 140 answers, then in step 240, data communication may take place between the management console 110 and the modem 140. This communication may involve the diagnosis of a problem involving the network component 160, to which the modem 140 is connected, or it may simply confirm whether the network component 160 is operating and/or whether the network component 160 is operating properly. Following step 240, the method terminates.

If, however, the modem 140 does not receive the incoming call in step 230, the method proceeds to step 250. In step 250, the answering machine 150 does or does not answer the incoming call on the phone line 130 within a second predetermined time period (e.g., three rings, ten seconds, etc.). If the answering machine 150 answers the incoming call, then the method continues at step 260.

In step 260, the answering machine 150 plays an outgoing message over phone line 130 and PSTN 120. The contents of the message are unimportant; the fact that the message is transmitted indicates to the management console 110 (or a user thereof) that there is a problem with either the modem 140 or the network component 160. Following step 260, the method terminates. Those of skill in the art will understand that the next step in diagnosing and repairing a problem with the modem 140 or the network component 160 may be to dispatch a technician to the site where the network component 160 is located; however, this or other subsequent troubleshooting steps are beyond the scope of the exemplary method 200.

While it is not required, the outgoing message played by the answering machine 150 may have specific characteristics. For example, the outgoing message may be encoded to identify the hardware, encrypted to prevent attackers from using it to do network mapping, etc. In another exemplary embodiment, the answering machine 150 may have the ability to measure and announce the temperature at the site in the outgoing message.

However, if the answering machine 150 does not answer in step 250, then the method proceeds to step 270. In this step, the problem may be diagnosed as a problem involving the power source 170. This presumption may be made because simultaneous failure of the network component 160, modem 140 and the answering machine 150 is a rare occurrence; if the answering machine 150 does not answer, it is reasonable to presume that power must have failed. Following step 270, the method terminates. As discussed above, further troubleshooting steps may follow but are beyond the scope of the exemplary method 200. For example, after concluding that there is a problem with the power source 170, a user of the management console 110 may dispatch a technician to the site where the power source 170 is located to determine the nature of the problem (e.g., in embodiments where the power source 170 is a power strip, surge protector, etc.), or may alternately contact the power provider for the site to inform them of the problem.

As described above, performance of the above exemplary method may be automated to periodically poll various network components for information about their status. In another exemplary embodiment including such automation, results of such polling may be recorded in a log file. Such a log file may then be analyzed to determine whether any discovered problems may be occurring systematically, rather than in isolated instances.

In another exemplary embodiment of the present invention, the system may include an answering machine that may be connected to the same power source as the network component, but may also provide a battery backup. In such an embodiment, the answering machine may be programmed to automatically place an outgoing call (e.g., to a management console) when it detects a power failure. This may thus automate the process of calling the modem for continuous monitoring.

The exemplary embodiments of the present invention may thus make it possible to more effectively remotely diagnose problems affecting network hardware components. Using the above-described exemplary embodiments, the information obtained by simply placing a phone call may inform a technician as to the specific nature of such problems, often saving a site trip that may be time-consuming and expensive. Further, the implementation of the above exemplary embodiments may be very simple, merely requiring commonly-accessible resources such as a phone line, a modem, an answering machine and a power strip.

The present invention has been described with reference to the above specific exemplary embodiments. However, those of ordinary skill in the art will recognize that the same principles may be applied to other embodiments of the present invention, and that the exemplary embodiments should therefore be read in an illustrative, rather than limiting, sense.

What is claimed is:

1. A method, comprising:
   initiating, by an initiating means, a telephone call to a telephone line that is connected to a modem and an answering machine, the modem being configured to answer the telephone call prior to the answering machine;
   determining, by determining means, whether the modem has answered the telephone call;
   if the modem has not answered the telephone call, determining, by the microprocessor, whether the answering machine has answered the telephone call; and
   providing, by providing means, a first indication to a user if neither of the modem nor the answering machine has answered the telephone call, the first indication indicating the existence of a problem with a component other than the modem and the answering machine.

2. The method of claim 1, further comprising:
   initiating, by the microprocessor, a diagnostic communication with the modem if the modem has answered the call.

3. The method of claim 1, wherein the modem is connected to a network component.

4. The method of claim 3, further comprising:
   receiving, by the microprocessor, an indication of a problem with the network component and initiating the telephone call in response to the indication of the problem.

5. The method of claim 1, further comprising:
   providing, by the microprocessor, a second indication to the user if the answering machine has answered the telephone call.

6. The method of claim 1, wherein the modem is configured to answer the telephone call before the expiration of a first predetermined time period.

7. The method of claim 6, wherein the answering machine is configured to answer the telephone call after the expiration of the first predetermined time period, but before the expiration of a second predetermined time period.

8. The method of claim 3, wherein the modem, the network component, and the answering machine are connected to a common power source.

9. A system, comprising:
a networking component connected to a power source;
a modem connected to the networking component, to the power source, and to a telephone line, the modem being configured to answer an incoming call on the telephone line after a first predetermined time period; and
a telephone answering machine connected to the power source and to the telephone line, the answering machine being configured to answer the incoming call on the telephone line after a second predetermined time period, the second time period being longer than the first predetermined time period,
wherein the telephone answering machine does not answer the incoming call if the modem answered the incoming call after the first predetermined time period,
and wherein, if neither the modem nor the telephone answering machine answers the telephone call, an indication is generated indicating, to a user, the existence of a problem with a component other than the modem and the answering machine.

10. The system of claim 9, wherein the modem is configured to conduct a diagnostic communication in response to answering the incoming call.

11. The system of claim 9, wherein the answering machine is configured to play an outgoing message in response to answering the incoming call.

12. The system of claim 11, wherein the outgoing message is encrypted to prevent unauthorized users from decoding the message.

13. The system of claim 11, wherein the outgoing message is encoded to identify one of a location and an identity of the answering machine.

14. The system of claim 11, wherein the answering machine thither includes a temperature sensor measuring a temperature at a location of the answering machine, the outgoing message including an indication of the temperature.

15. The system of claim 9, wherein the first predetermined time period corresponds to one ring of the phone call.

16. The system of claim 9, wherein the second predetermined time period corresponds to three rings of the phone call.

17. A system comprising a memory storing a set of instructions and a processor executing the instructions, the set of instructions operable to:
initiate a telephone call to a telephone line that is connected to a modem and an answering machine, the modem being configured to answer the telephone call prior to the answering machine;
determine whether the modem has answered the telephone call;
if the modem has not answered the telephone call, determine whether the answering machine has answered the telephone call; and
provide a first indication to a user if neither of the modem nor the answering machine has answered the telephone call, the first indication indicating the existence of a problem with a component other than the modem and the answering machine.

18. The system of claim 17, wherein the instructions are further operable to:
initiate a diagnostic communication with the modem if the modem has answered the call.

19. The system of claim 17, wherein the modem is connected to a network component and the instructions are further operable to:
receive an indication of a problem with the network component and initiate the telephone call in response to the indication of the problem.

20. The system of claim 17, wherein the instructions are further operable to:
provide a second indication to the user if the answering machine has answered the telephone call.

* * * * *